United States Patent
Buchheit et al.

(10) Patent No.: US 6,580,240 B2
(45) Date of Patent: Jun. 17, 2003

(54) ACTIVATION DEVICE FOR A FUNCTIONAL COMPONENT OF MOTOR VEHICLE EQUIPMENT EQUIPPED WITH A SAFETY DEVICE

(75) Inventors: Marc Buchheit, L'Isle Jourdain (FR); Francois Breynaert, Caen (FR)

(73) Assignee: Meritor Light Vehicle Systems-France (FR)

( * ) Notice: Subject to any disclaimer, the term of this patent is extended or adjusted under 35 U.S.C. 154(b) by 0 days.

(21) Appl. No.: 10/054,675

(22) Filed: Jan. 22, 2002

(65) Prior Publication Data

US 2002/0117985 A1 Aug. 29, 2002

(30) Foreign Application Priority Data

Feb. 5, 2001 (FR) .............................. 01 01517

(51) Int. Cl.$^7$ ............................................... H02K 17/32
(52) U.S. Cl. .................. 318/434; 318/475; 318/265; 318/470; 318/466
(58) Field of Search ................. 318/434, 475, 318/265, 470, 466; 49/26

(56) References Cited

U.S. PATENT DOCUMENTS

| | | | |
|---|---|---|---|
| 4,429,265 A | 1/1984 | Barnard | |
| 4,458,445 A | * 7/1984 | Sauer et al. | 49/26 |
| 4,635,542 A | 1/1987 | Sebelist et al. | |
| 4,918,998 A | 4/1990 | Periou | |
| 5,351,439 A | * 10/1994 | Takeda et al. | 49/28 |
| 5,832,664 A | * 11/1998 | Tajima et al. | 318/434 |

OTHER PUBLICATIONS

French Search Report dated Sep. 26, 2001.

* cited by examiner

*Primary Examiner*—Karen Masih
(74) *Attorney, Agent, or Firm*—Carlson, Gaskey & Olds

(57) ABSTRACT

An activation device for a functional component of motor vehicle equipment having an electric motor includes a transmission device connected on the one hand to an output shaft of the motor and on the other hand to said functional component, so that the transmission device and the motor exert mutual forces upon one another, and a safety device adapted for modifying the electrical supply of the motor according to an operating parameter significant of said mutual forces. The motor is mounted on the equipment with at least one degree of movement with respect thereto, and the safety device has means of measuring the movement of the motor delivering measurement signals which determine the operating parameter. The activation device is particularly applicable to electric window winder or sun-roof systems.

14 Claims, 1 Drawing Sheet

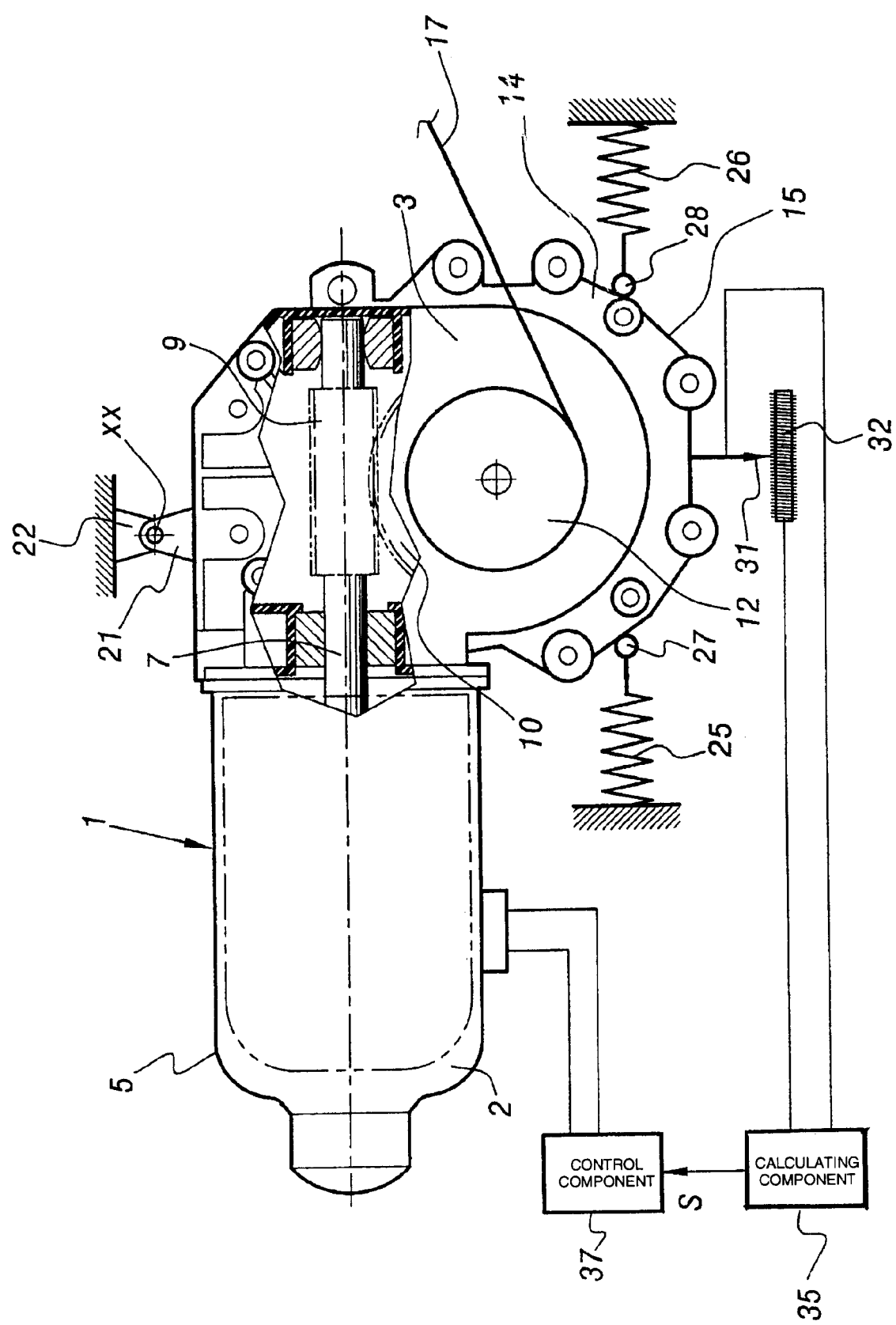

ACTIVATION DEVICE FOR A FUNCTIONAL COMPONENT OF MOTOR VEHICLE EQUIPMENT EQUIPPED WITH A SAFETY DEVICE

BACKGROUND OF THE INVENTION

This invention relates to an activation device for a functional component of motor vehicle equipment having an electric motor, a transmission device connected on the one hand to the output shaft of the motor and on the other hand to the functional component, so that the transmission device and the motor exert mutual forces upon one another, and a safety device adapted for modifying the electrical supply of the motor according to an operating parameter produced in response to mutual forces.

In particular, the invention applies to an electric window winder module or an electric sun-roof module for a motor vehicle.

In order to comply with the various safety standards in force in a number of countries, the safety devices of such activation devices must be capable of detecting abnormal operating conditions and of acting accordingly on the electric motor.

For example, in the case cited above of an electric window winder system, it is necessary to interrupt the operation of the motor and/or reverse the direction of rotation of its shaft, as soon as it is determined that the motor shaft is undergoing an excessive mechanical resistance. Such conditions correspond to, for example, the pinching of a member of a user between the top edge of the window and the door frame when the window is activated in its direction of closure.

There already exist a number of types of safety devices that make it possible to interrupt or reverse the movement of a window or sun-roof upon the appearance of such operating anomalies. Such devices use, for example, torque sensors associated with the motor shaft or means of measuring the electrical power consumed by the motor, etc.

However, these devices are highly complex in design and implementation, or are not adapted to react in real time when an operating anomaly occurs.

SUMMARY OF THE INVENTION

A principal aim of the invention is to remedy these drawbacks and propose an activation device of the type cited above, equipped with a safety device making it possible, by simple and reliable means, to link the operation of the electric motor with a measured parameter, depending directly on the resistant force exerted on the functional component opposing the motive force.

According to one aspect of the present invention, there is provided an activation device for a functional component of an item of motor vehicle equipment having an electric motor with an output shaft, the activation device comprising a transmission device connected to the output shaft of said electric motor and to said functional component, so that the transmission device and the motor exert mutual forces upon one another, and a safety device adapted for modifying the electrical supply of the motor according to an operating parameter resultant of said mutual forces; wherein the motor is mounted on the motor vehicle equipment with at least one degree of movement with respect thereto, and the safety device has means of measuring the movement of the motor delivering measurement signals which determine the operating parameter.

According to other characteristics of the invention:

the motor can mounted on the equipment by a pivot link;
the device can have means of resilient return of the motor into a neutral position with respect to the equipment;
said return means can have at least one calibrated spring;
said measuring means can have a resistive gauge;
said resistive gauge is a resistive element fixed with respect to the equipment, the resistance of which is a function of the position of the motor with respect to said resistive element;
the device can have a control component for the motor and the safety device has a calculating component adapted to receive the measurement signals and deliver, to the control component, an alarm signal, according to said measurement signals; and
the alarm signal can be a signal for stopping or reversing the motor if the operating parameter crosses a predetermined threshold value.

According to a second aspect of the present invention, there is provided an item of motor vehicle equipment having an activation device for a functional component of the item of motor vehicle equipment, said item of motor vehicle equipment having an electric motor with an output shaft, the activation device comprising a transmission device connected to the output shaft of said electric motor and to said functional component, so that the transmission device and the motor exert mutual forces upon one another, and a safety device adapted for modifying the electrical supply of the motor according to an operating parameter resultant of said mutual forces; wherein the motor is mounted on the motor vehicle equipment with at least one degree of movement with respect thereto, and the safety device has means of measuring the movement of the motor delivering measurement signals which determine the operating parameter.

This equipment comprises of, for example, a motor vehicle door or, as mentioned previously, an electric window winder module or an electric sun-roof module.

According to a third aspect of the present invention, there is provided an item of motor vehicle equipment in the form of an electric window winder module, said electric window module being linked with an electric motor with an output shaft, there being an activation device comprising a transmission device connected to the output shaft of the electric motor and to the electric window winder module, so that the transmission device and the motor exert mutual forces upon one another, and a safety device adapted for modifying the electrical supply of the motor according to an operating parameter resultant of said mutual forces; wherein the motor is mounted on the motor vehicle equipment with at least one degree of movement with respect thereto, and the safety device has means of measuring the movement of the motor delivering measurement signals which determine the operating parameter.

According to a fourth aspect of the present invention, there is provided an item of motor vehicle equipment in the form of a door containing an electric window winder module, said electric window module being linked with an electric motor with an output shaft, there being an activation device comprising a transmission device connected to the output shaft of the electric motor and to the electric window winder module, so that the transmission device and the motor exert mutual forces upon one another, and a safety device adapted for modifying the electrical supply of the motor according to an operating parameter resultant of said mutual forces; wherein the motor is mounted on the motor vehicle equipment with at least one degree of movement with respect thereto, and the safety device has means of measuring the movement of the motor delivering measurement signals which determine the operating parameter.

The invention also extends to a vehicle having an activation device or an item of motor vehicle as defined above.

BRIEF DESCRIPTION OF THE DRAWING

For a better understanding of the invention and to show how the same may be carried into effect, reference will now be made, by way of example, to the accompanying drawing, in which the single FIGURE shows a schematic plan view of an activation device according to the invention, in which the electric motor has been depicted partially in section.

DESCRIPTION OF THE PREFERRED EMBODIMENT

The FIGURE depicts an activation device according to the invention intended for a functional component of motor vehicle equipment. The device depicted applies more particularly to an electric window winder system, in which the functional component is constituted by the window, the equipment is constituted by the window winder module, such as mounted in a door, or the equipped door itself.

The activation device comprises firstly an electric motor 1, which here designates the geared motor assembly composed of the actual motor component 2 and a reduction gear component 3.

The motor component 2 has basically a stator casing 5 in which a rotor shaft 7 is mounted rotatably. Close to one of its ends, the rotor shaft 7 has a threaded section 9 engaging with a toothed wheel 10 of the reduction gear component 3. The toothed wheel 10 rotationally drives, directly or by means of intermediate pinions (not shown) a drum 12. The assembly constituted by the toothed wheel 10, the drum 12, and the intermediate pinions, if any, is housed in a case 14 of the reduction gear component 3. The case 14 has an external outline 15 configured as a cam.

The drum 12 constitutes, according to the terminology used here, the output shaft of the motor 1, and drives a transmission device 17 formed by a relatively rigid cable. Under the effect of the rotation of the drum 12, the cable 17 runs in guides (not shown) and drives translationally, in one direction or the other, supports fixedly attached to the window.

The motor 1 has, on the case 14, a projecting fixing tab 21, which co-operates with a complementary fixing component 22 in a pivot link, with axis X—X substantially orthogonal to the general direction of the cable 17 close to the motor 1. The complementary fixing component 22 is immovably attached to the door, or the electric window winder module fixed to the door.

Thus, the motor 1 is capable of rotation around the axis X—X under the effect of the force exerted by the cable 17 on the drum 12.

The motor 1 is maintained in a neutral angular position with respect to the axis X—X by means of two axial springs 25, 26 with the same axis, orthogonal to the axis of rotation X—X. One end 27, 28 of each spring 25, 26 is configured as a finger bearing on the cam 15 of the case 14 at opposite points, so that the elastic reaction forces of the springs 25, 26 on the case 14 are exerted in opposite directions. The other end of each of the springs 25, 26 is fixed to the door or to the module. The springs 25, 26 are calibrated springs so that the angular displacements of the motor 1 with respect to the axis X—X are associated with a resistant elastic or resilient force by a known relationship.

In an intermediate area of the case 14, between the areas of contact with the fingers 27, 28, the case 14 has a projecting slider 31 constituting the slider associated with a linear type variable resistor 32. The variable resistor 32 and its slider 31 are electrically connected to a calculating component 35, adapted to determine the resistance value of the resistive gauge constituted by the variable resistor 32 corresponding to the position of the slider 31. The calculating component 35 issues an alarm signal 5 to a control component 37 for the motor 1, this signal 5 being related to the angular position of the motor 1 with respect to its neutral position around the axis X—X, and therefore directly resultant of the force exerted by the cable 17 on the drum 12.

The control component 37, which is electrically connected to the motor 1, controls the power supply of the motor 1 according to the signal 5 it receives from the calculating component 35.

It is self-evident that the calculating component 35 can be programmed in a number of different ways, for example so that the alarm signal 5 causes the disconnection of the power supply of the electric motor 1 as soon as the value of the measured operating parameter, namely the resistance value of the variable resistor 32, crosses a predetermined threshold, or so that the signal 5, in this same situation, causes an electrical supply of the motor 1 to reverse the direction of rotation of the rotor shaft 7.

It will be appreciated that there is produced, by means of the present invention, a safety device lacking strain or torque sensors, and lacking complex design or implementation.

The foregoing description is only exemplary of the principles of the invention.

Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An activation device for a functional component of a motor vehicle equipment having a motor with an output shaft, the activation device comprising:

a transmission device connected to the output shaft of the motor and to said functional component so that the transmission device and the motor exert mutual forces upon one another; and a safety device that generates an operating parameter resultant of the mutual forces, wherein the safety device modifies an electrical supply of the motor according to the operating parameter, wherein the motor is mounted on the motor vehicle equipment with at least one degree of movement, and wherein the safety device has a measurement system to measure the movement of the motor, generate the operating parameter based on the movement of the motor, and compare the operating parameter with a predetermined threshold value to determine whether to modify the electrical supply.

2. The device according to claim 1, wherein the electric motor is mounted on the equipment by a pivot link.

3. The device according to claim 1, wherein the device has a return system to provide resilient return of the motor into a neutral position with respect to the equipment.

4. The device according to claim 3, wherein said return system includes at least one calibrated spring.

5. The device according to claim 1, wherein said measurement system includes a resistive gauge.

6. The device according to claim 5, wherein said resistive gauge is a resistive element fixed with respect to the motor vehicle equipment, the resistance of which is a function of the position of the motor with respect to said resistive element.

7. The device according to claim 1, wherein the device has a control component for the motor and wherein the calculating component is adapted to receive a measurement signal corresponding to the movement of the motor, wherein the measurement signal is used to generate the operating parameter, and wherein the calculating component delivers an alarm signal to the control component according to said measurement signal.

8. The device according to claim 7, wherein the alarm signal is a signal for stopping the motor if the operating parameter crosses the predetermined threshold value.

9. The device according to claim 7, wherein the alarm signal is a signal for reversing the motor if the operating parameter crosses the predetermined threshold value.

10. A motor vehicle equipment comprising:

a motor with an output shaft;

a functional component; and an activation device having
a transmission device connected to the output shaft of the motor and to said functional component, so that the transmission device and the motor exert mutual forces upon one another, and
a safety device that generates an operating parameter resultant of the mutual forces, wherein the safety device modifies an electrical supply of the motor according to the operating parameter, wherein the motor is mounted on the motor vehicle equipment with at least one degree of movement, and wherein the safety device has a measurement system to measure the movement of the motor, generate the operating parameter based on the movement of the motor, and compare the operating parameter with a predetermined threshold value to determine whether to modify the electrical supply.

11. The item of motor vehicle equipment according to claim 10, wherein the functional component of the item of motor vehicle equipment is an electric sunroof module.

12. The motor vehicle equipment of claim 10, wherein the functional component is an electric window winder module.

13. A vehicle door, comprising:

an electric motor;

an electric window winder module disposed in the vehicle door, said electric window module being linked with an electric motor with an output shaft; and an activation device having
a transmission device connected to the output shaft of the electric motor and to the electric window winder module so that the transmission device and the motor exert mutual forces upon one another, and
a safety device that generates an operating parameter resultant of the mutual forces, wherein the safety device modifies an electrical supply of the motor according to the operating parameter, wherein the motor is mounted in the vehicle door with at least one degree of movement, and wherein the safety device has a measurement system to measure the movement of the motor, generate the operating parameter based on the movement of the motor, and compare the operating parameter with a predetermined threshold value to determine whether to modify the electrical supply.

14. A motor vehicle, comprising:

at least one vehicle door;

an electric motor with an output shaft;

an electric window winder module disposed in each vehicle door; and an activation device in each vehicle door, the activation device having
a transmission device connected to the output shaft of said electric motor and to said electric window winder module so that the transmission device and the motor exert mutual forces upon one another, and
a safety device that generates an operating parameter resultant of the mutual forces, wherein the safety device modifies an electrical supply of the motor according to the operating parameter, wherein the motor is mounted in said at least one vehicle door with at least one degree of movement, and wherein the safety device has a measurement system to measure the movement of the motor, generate the operating parameter based on the movement of the motor, and compare the operating parameter with a predetermined threshold value to determine whether to modify the electrical supply.

* * * * *